Patented Aug. 4, 1942

2,291,609

UNITED STATES PATENT OFFICE 2,291,609

MONOCALCIUM PHOSPHATE AND PROCESS FOR PRODUCING THE SAME

William W. Cobbs, deceased, late of Dayton, Ohio, by W. Walker Lewis, Jr., administrator, Dayton, Ohio, and Carroll A. Hochwalt, Montgomery County, Ohio, assignors to Monsanto Chemical Company, a corporation of Delaware No Drawing. Application May 26, 1941, Serial No. 395,208

15 Claims. (Cl. 99—95)

This invention relates to improved chemical leavening agents of the calcium phosphate type.

Monocalcium orthophosphate has been known and used as a leavening agent and baking acid for many years. As ordinarily prepared in the hydrated form it contains one molecule of water, possesses rapid solubility and reacts rapidly with alkaline bicarbonates to liberate carbon dioxide gas, which gas performs the leavening function during baking. It is also possible to prepare an anhydrous form of monocalcium orthophosphate by reaction of lime and phosphoric acid, however this material in the pure form also reacts comparatively rapidly. In order to control the rate at which carbon dioxide is liberated by leavening preparations, it has been proposed to coat the anhydrous or the hydrated orthophosphate with a protective film of various materials of an organic or inorganic nature in order to slow down the reaction between such orthophosphates and bicarbonates when reacting together in moist dough.

In prior patents it has been proposed to utilize relatively impure phosphoric acid for the production of anhydrous monocalcium orthophosphate, it having been observed that the impurities present in this acid were of such a nature as to form glassy or vitreous coatings upon the individual crystals. The impurities present in the phosphoric acid which, upon formation of the monocalcium orthophosphate crystals could produce the glassy or vitreous coating were essentially the alkali metals sodium and potassium. There were other impurities present in the acid such as iron and aluminum, magnesia and silica, however, these minor impurities appeared to have no advantage for the production of the moisture resistant coating upon the normally hygroscopic monocalcium phosphate crystals.

In an earlier patent it had also been proposed to add to the phosphoric acid from which monocalcium orthophosphate was to be prepared, a quantity of iron, aluminum or chromium. These metals were found to cause the formation of a larger percentage of granular product as distinguished from the very fine powdery material. The advantage of a granular form of product was that a somewhat greater stability of the leavening preparation made therewith, was obtained than with the very finely divided powdery material.

One object of the present invention is to provide a process for the production of anhydrous monocalcium orthophosphate leavening agents in which an alumina containing acid is utilized for the purpose of obtaining a leavening agent having delayed or reserve leavening properties. A further object is the provision of a process for the production of an aluminum phosphate bearing anhydrous monocalcium phosphate leavening agent, which has a coating of crystalline dicalcium phosphate and aluminum phosphates upon the individual monocalcium phosphate crystals thereof, and which exhibits pronounced ability to resist the action of humid atmospheres.

We have now found that if alumina or an acid soluble aluminum salt or compound be dissolved in phosphoric acid, that such acid can then be reacted with lime or a lime base to produce the anhydrous monocalcium orthophosphate without the production of granular material and that this product can then be subsequently treated by subjecting it to humid atmospheres to cause a hydrolysis or reaction of the associated acid aluminum phosphates present to more basic phosphates. The product so treated may then be subjected to a heating operation whereby a crystalline aluminum phosphate coating in insoluble form is produced upon the crystals of the anhydrous phosphate by dehydration of the previously formed hydrolysis products. Alternatively the alumina or other acid soluble aluminum compound or aluminum metal may be added, in the required amounts, to the lime and acid during the mixing operation. Such addition may be made either to the acid or to the reacting mixture and preferably prior to the formation of substantial amounts of anhydrous monocalcium orthophosphate crystals in the reacting mass.

In producing a leavening agent in accordance with our present invention we react together lime and a strong phosphoric acid under conditions such that temperatures upwardly of 140° C. are produced by the reaction and these temperatures are moreover maintained somewhat below 180° C.–175° C. The proportions of lime employed are such as to produce in the finished product a slight excess of lime which is present in the product as dicalcium phosphate. The amount of lime preferably utilized will normally be in the range of 105%–115% to 120% of theory, that is an excess of from 5% to 10% or 15% or even as much as 20% may be employed.

Since phosphate leavening agents are largely used in producing self-rising flour and furthermore since such phosphate is ordinarily added in the flour mill directly to warm moist flour, it is desirable that the moisture present in the flour not hydrate the anhydrous phosphate so as to increase its reaction rate, that is the rate at which it liberates carbon dioxide in a leavening preparation. It is desirable, therefore, that the phosphate itself be resistant toward moisture present in the flour or that it be protected against the effects of moisture. Our product embodies such protection in the form of a moisture resistant developed coating or envelope.

An important property of phosphate leavening agents is the rate at which such agents react with alkaline bicarbonates during their incorporation into moist dough and a second important property is measured by the humectant property of the product by which is meant the avidity with which the product absorbs moisture. Both of these properties may be measured in the laboratory by suitable tests. The rate of reaction during leavening of a phosphate leavening agent may for example, be measured in accordance with the method described in Cereal Chemistry, vol. 8, page 423, 1931. The dough reaction rate therein described is obtained as the percentage of carbon dioxide liberated over definitely measured time intervals. From the dough reaction rate values there may be calculated what is termed herein as "available carbon dioxide" which is the value obtained by subtracting the 2 minute value from the 10 minute value of evolved carbon dioxide as obtained from the dough reaction rate test. In this definition of "available carbon dioxide," the amount of carbon dioxide liberated from the leavening preparation in the first 2 minutes is eliminated and only that liberated during the succeeding 8 minutes is comprised within the term "available carbon dioxide." This conception of available carbon dioxide is of value in the testing of leavening agents having delayed or reserve leavening powers.

The humectant property of a leavening agent is that property which characterizes its resistance to moisture absorption. For the purpose of this application the humectant by which the present product is tested comprises an exposure of the product to an atmosphere of 75% relative humidity at 30° C. for a period of 72 hours. Upon exposure of normally hygroscopic materials to humid atmospheres an increase in weight occurs, which increase in weight may be measured and the value thus obtained is used as a measure of the hygroscopicity of the material. After exposure of the material to the humectant above described, the dough reaction rate test may again be applied to the exposed product and if the moisture absorbed by the sample under test has served to hydrate the anhydrous monocalcium phosphate, it will generally be found that the available carbon dioxide as defined above, will have suffered a decrease, the decrease depending upon the extent of hydration of the anhydrous phosphate. It is therefore the practice to determine the available carbon dioxide before and after exposure to the humectant and a comparison of the available carbon dioxide obtained after the humectant with that obtained before the humectant will afford a measure of the resistance of the product to absorption of and reaction with moisture.

The amount of alumina which may be dissolved or contained in the acid prior to the reaction of said acid with lime according to our process, may vary over the range of 0.3% to 3% $Al_2O_3$ in the product. For the purpose of illustrating our invention we herewith give as an example the following procedure which may be used in producing our product.

Example 1

Five ounces of $Al(OH)_3$ are dissolved in 180 ounces of 80% $H_3PO_4$ and the acid then heated to 130° C. We then place in a stainless steel mixer 16.3 ounces of CaO of 20 to 40 mesh and then pour in the acid containing the dissolved alumina. After a few minutes of stirring of the reacting mass we add an additional 16.4 ounces of pulverized CaO, which is added over a period of 5 minutes and the mass stirred for an additional 3 minutes. The temperature should rise to slightly above 140° C. We then add 17.4 ounces of calcium hydrate slowly over a period of 10 minutes, stirring the mass for 1¼ hours. Heat is applied to the mixer and by means of such heat the temperature of the mixer contents is maintained somewhat above 140° C. The material may then be removed from the mixer. It will be found to contain in the neighborhood of under 1% and preferably from .05% to 0.1% of free acid. The product as herein illustrated will contain in the neighborhood of 2% equivalent $Al_2O_3$. Approximately 11 pounds of product is obtained.

After the material, as produced above, has cooled somewhat, it is subjected to a curing operation in which the material, as produced above, is exposed to contact with humid air to effect hydrolysis of the contained aluminum phosphates. The air may have a moisture content equivalent to from 40% relative humidity upwards to substantial saturation. The temperature of the air is preferably maintained in the neighborhood of room temperature but may also be used at higher temperatures, that is at temperatures of 50° C. to 60° C. but preferably below 80° C. During the exposure of the product to the humid air the material is agitated as in a rotary dough mixing machine equipped with a suitable air inlet so that an intimate contact between the product and the humid air is obtained. The time of curing will vary from 4 to 7 hours and generally the free acid content of the product rises somewhat and may increase to as much as .15% to .20% or more. For the purpose of overcoming the objectionable free acid thus liberated, we add to the product at the conclusion of the curing operation or during said operation, a small amount of tricalcium phosphate. Upon the addition of this material the product becomes very dry and free flowing and the free acid content is thereupon decreased to a lower level of .02% to .05%.

After the conclusion of the curing step we now subject the product to a drying or dehydrating step by heating to a temperature in the neighborhood of 205° C. to 220° C., which temperature is maintained for a period of time sufficient to convert the hydrolysis products developed during the curing step to pyrophosphates. The hydrolysis products obtained during curing are largely the dialuminum orthophosphate and the aluminum diorthophosphate. Upon the application of heat to the product these compounds are converted to aluminum pyrophosphate.

The reactions by which the aluminum phosphate and dicalcium phosphate contained in the anhydrous crystals, is obtained as an insoluble coating in our process, are believed to take place in the following manner:

Solution of an aluminum salt, oxide or hydrate in phosphoric acid is believed to result in the formation of dissolved monoaluminum orthophosphate, $Al(H_2PO_4)_3$. During the addition of lime to the acid, the monoaluminum phosphate contained therein is believed to crystallize or precipitate out of solution and to be more or less uniformly distributed throughout the monocalcium phosphate crystals.

Upon the addition of amounts of lime, in excess of that theoretically equivalent to form the monocalcium phosphate, $CaH_4(PO_4)_2$, some dicalcium orthophosphate crystals, $CaHPO_4$, will be formed, which compound is somewhat more basic than the monocompound. Since lime is added after formation of monocalcium phosphate crystals in the mass the dicalcium phosphate crystals will be produced after the formation of the monocalcium phosphate crystals, and hence the later formed dicalcium phosphate crystals will be distributed upon the surfaces of the monocalcium crystals.

The curing operation to which the material is subjected may cause an hydrolysis of the monoaluminum phosphate, induced by the moisture present to take place as for example:

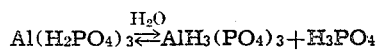

and

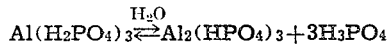

with liberation of free phosphoric acid.

Free acid thus liberated may react with any of the more basic compounds present, as for example dicalcium phosphate to form monocalcium orthophosphate monohydrate. The free acid is however usually not completely eliminated by reaction with the dicalcium phosphate and it is preferred therefore, that an addition of a more basic material be made at or near the conclusion of the curing operation. For this purpose we prefer to make an addition of say ½% of tricalcium orthophosphate, of the type used as a salt filler.

The curing operation may also include a reaction between monoaluminum phosphate and dicalcium orthophosphate as for example:

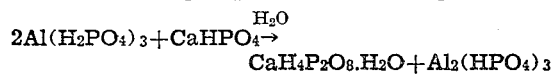

which reaction is favored by the water vapor present during curing.

After the free acid in the product caused by curing has been largely eliminated by the addition of the basic material, the product will contain free acid under 0.1% and preferably under 0.02% to .05%, and will then be subjected to a drying step in which the product is heated to a temperature of 205° C. to 220° C. During this drying or dehydrating step the aluminum phosphates of basicity intermediate between the acid monoaluminum orthophosphate, $Al(H_2PO_4)_3$ and the trialuminum orthophosphate, $AlPO_4$, are converted to pyrophosphates substantially according to the following reactions:

1. $Al_2(HPO_4)_3 \rightleftarrows Al_4(P_2O_7)_3 + 3H_2O$
2. $AlH_3(PO_4)_2 \rightleftarrows Al_4(P_2O_7)_3 + 2H_3PO_4 + 3H_2O$ together with some remaining $Al(H_2PO_4)_3$, which will dehydrate to the corresponding acid pyrophosphate, $Al_2H_6(P_2O_7)_3$. At the same time the monocalcium phosphate monohydrate is converted to the anhydrous compound.

During the conversion of the orthophosphates as above indicated a slight rise in acidity occurs which is believed to be caused by reaction (2) above. The free acid thus liberated may be neutralized by more basic substances present as for example $CaHPO_4$ or $Ca_3(PO_4)_2$. The final product will have a free acid value generally under .02% to .04%.

The amount of alumina which is incorporated in the product during the mixing operation is critical and according to our determination lies between 0.3% and 3.0% $Al_2O_3$ and preferably between 0.5% to 0.6% and 2.0% to 2.5% $Al_2O_3$. Larger amounts of alumina for some reason cause a marked decrease of available gas upon storage as in self-rising flour mixtures, while smaller amounts also cause the product to show a marked decrease in stability.

We have furthermore, found the curing or hydrolysis step as herein applied to be necessary for the production of a stable product yielding a high percentage of available gas. In a series of tests in which the alumina content was varied over the range from 0.1% $Al_2O_3$ to 3.0% $Al_2O_3$ and when curing or hydrolysis was omitted in the process the products uniformly showed a loss of from 30% to 37% of the available $CO_2$ upon exposure to the humectant test. When the process was repeated and the mixed product cured as described above, the loss of available $CO_2$ from products containing between slightly more than 0.3% $Al_2O_3$, and somewhat less than 3% $Al_2O_3$, showed a loss of only 10% to 15% of the available gas under the same test conditions. This is well within the range of stability required for commercial purposes.

The acid employed in our process is substantially pure, that is, it contains normally only minor amounts of iron, alumina, silica, sodium and potassium, and of course impurities such as lead and arsenic are eliminated previous to use herein. Likewise the lime contains only those impurities normally present in good grades of chemical lime.

The preferred composition of our product may approximate the following analysis:

| | | |
|---|---|---|
| CaO | per cent | 24.29 |
| $P_2O_5$ | do | 59.28 |
| Ignition loss | do | 14.43 |
| $SO_3$ | do | 0.03 |
| $Fe_2O_3$ | do | .039 |
| $Al_2O_3$ | do | 2.0 |
| F | parts per million | 14 |
| Pb | do | 0.9 |
| $Na_2O$ and $K_2O$ | per cent | 0.07 |

Our product as herein produced comprises anhydrous monocalcium orthophosphate crystals, the surfaces of which bear a coating of crystalline dicalcium orthophosphate which crystals are cemented together by a matrix consisting of normal and acid aluminum pyrophosphate crystals. The matrix is substantially free of trialuminum orthophosphate.

This product is distinguished from that obtained when the material is dehydrated without being first cured, by the fact that when the curing step is omitted the product contains substantially no aluminum pyrophosphate. It appears that the aluminum pyrophosphate, when produced as a constituent of the coating, is the critical component for obtaining effective moisture resistance and a high available gas yield.

What we claim is:

1. The process for producing a monocalcium phosphate leavening composition, comprising mixing together lime, phosphoric acid and an aluminum compound in amount such that the final product will contain between 0.3% and 3% equivalent $Al_2O_3$, the proportion of lime used being somewhat in excess of that theoretically required to form anhydrous monocalcium orthophosphate, thereupon exposing the product thus obtained to humid atmospheres whereupon aluminum phosphate present is converted to an aluminum phosphate more basic than monocalcium orthophosphate and then dehydrating said product to convert aluminum orthophosphates present to pyrophosphates, while avoiding substantial loss of available acidity for leavening purposes.

2. The process for producing a monocalcium phosphate leavening composition, comprising reacting together lime, phosphoric acid and an acid soluble aluminum compound under conditions to produce anhydrous monocalcium orthophosphate, the amount of lime reacted being sufficient to produce a small proportion of dicalcium phosphate present in said monocalcium orthophosphate and the amount of aluminum compound being such as to furnish between 0.3% and 3.0% equivalent $Al_2O_3$ in the product, said reaction yielding an intermediate product containing less than 1% of free acid, exposing said intermediate product to the action of moist air to effect an hydrolysis of said acid soluble aluminum compound and to form more basic aluminum compounds therewith, neutralizing said free acid by the addition of a basic material, and thereupon heating said product to a temperature sufficient to convert said more basic aluminum compounds to aluminum pyrophosphate, while avoiding substantial loss of available acidity for leavening purposes.

3. The process defined in claim 2 in which the acid soluble aluminum compound is present in amount so as to furnish between 0.5% and 2.5% equivalent $Al_2O_3$ in said final product.

4. The process defined in claim 2 in which the product is exposed to air of more than 40% relative humidity.

5. In the process of producing a monocalcium phosphate leavening agent in which alumina bearing phosphoric acid is reacted with an excess of lime base to form anhydrous monocalcium orthophosphate crystals containing some dicalcium orthophosphate, the step of exposing said anhydrous monocalcium phosphate crystals to the action of water vapor to form aluminum phosphates more basic than monoaluminum orthophosphate.

6. The process defined in claim 5 in which dialuminum orthophosphate $Al_2(HPO_4)_3$ is formed by the action of said water vapor.

7. The process for producing a monocalcium orthophosphate leavening composition, comprising mixing together lime, phosphoric acid and monoaluminum orthophosphate under conditions to produce anhydrous monocalcium orthophosphate containing an excess of from 5% to 20% of lime over that contained in pure monocalcium orthophosphate, the amount of aluminum phosphate being sufficient to furnish between 0.3% and 3% of $Al_2O_3$ equivalent, in the final product, exposing said anhydrous monocalcium phosphate to the action of water vapor to convert said monoaluminum orthophosphate to a more basic orthophosphate of aluminum, and thereupon heating said product to a temperature sufficient to convert said basic orthophosphate of aluminum to pyrophosphates of aluminum.

8. The process defined in claim 7 in which the aluminum phosphate present is sufficient to furnish between 0.5% and 2.5% of equivalent $Al_2O_3$ in the product.

9. The process for producing a monocalcium orthophosphate leavening composition comprising reacting together lime, phosphoric acid and a phosphoric acid soluble aluminum compound under conditions to produce anhydrous monocalcium orthophosphate, the proportion of lime reacted being from 5% to 20% over that theoretically required to form monocalcium orthophosphate, the amount of aluminum compound reacted being sufficient to furnish between 0.3% and 3.0% of $Al_2O_3$ equivalent in the final product, exposing said reaction product to the action of water vapor to convert monoaluminum orthophosphate to a more basic orthophosphate of aluminum, and thereupon heating said product to a temperature sufficient to convert said orthophosphate of aluminum to pyrophosphates of aluminum.

10. A monocalcium orthophosphate leavening composition, comprising crystals of anhydrous monocalcium orthophosphate bearing upon the surfaces of said crystals, a coating comprising crystals of dicalcium phosphate in a matrix of crystals of aluminum pyrophosphate, said coated crystals containing between 0.3% and 3.0% $Al_2O_3$ equivalent.

11. The product defined in claim 10, in which the coating contains acid aluminum pyrophosphate in addition to the normal aluminum pyrophosphate.

12. The product defined in claim 10, in which the equivalent alumina content is between 0.5 and 2.5%.

13. A monocalcium orthophosphate leavening composition, comprising crystals of anhydrous monocalcium orthophosphate, said crystals containing a minor amount of aluminum phosphate, and having surfaces coated with a deposit of crystalline dicalcium phosphate and aluminum pyrophosphate, said aluminum pyrophosphate, in conjunction with said dicalcium orthophosphate, protecting said anhydrous monocalcium orthophosphate against hydration, said composition containing between 0.5% and 2.5% $Al_2O_3$.

14. The product defined in claim 13 in which the alumina content is in the neighborhood of 2%.

15. A monocalcium orthophosphate leavening composition, comprising crystals of anhydrous monocalcium orthophosphate, said crystals containing an excess of CaO over that contained in pure anhydrous monocalcium orthophosphate, and containing between 0.5% and 2.5% $Al_2O_3$ combined as a phosphate, said crystals bearing a coating of crystalline dicalcium phosphate and crystalline aluminum phosphates including aluminum pyrophosphate associated with said dicalcium phosphate in said coating.

W. WALKER LEWIS, Jr.,
*Administrator of the Estate of William W. Cobbs, Deceased.*

CARROLL A. HOCHWALT.